US012790010B2

(12) United States Patent
Tullett et al.

(10) Patent No.: US 12,790,010 B2
(45) Date of Patent: Nov. 10, 2026

(54) AIRCRAFT POWER SYSTEM

(71) Applicant: Hamilton Sundstrand Corporation, Charlotte, NC (US)

(72) Inventors: James Thomas Marshall Tullett, Birmingham (GB); Mital Shah, Harrow (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/826,852

(22) Filed: Sep. 6, 2024

(65) Prior Publication Data

US 2025/0145299 A1 May 8, 2025

(30) Foreign Application Priority Data

Nov. 8, 2023 (EP) .................................... 23208630

(51) Int. Cl.

*H02J 105/30* (2026.01)
*B64D 27/33* (2024.01)
*B64D 27/35* (2024.01)
*H02J 4/00* (2026.01)
*H02M 1/44* (2007.01)
*H02M 7/797* (2006.01)

(52) U.S. Cl.

CPC .............. *B64D 27/35* (2024.01); *H02M 1/44* (2013.01); *H02M 7/797* (2013.01)

(58) Field of Classification Search

CPC ........ B64D 27/35; B64D 27/33; B64D 33/00; H02M 1/44; H02M 7/797; Y02T 50/60; H02J 4/00; H02J 2310/44
USPC .......................................................... 307/9.1
See application file for complete search history.

(56) References Cited

U.S. PATENT DOCUMENTS 6,439,504 B1 8/2002 Ahrendt
9,587,584 B2 3/2017 Maalioune et al.
10,975,801 B2 4/2021 Seka
11,338,926 B2 5/2022 Dierksmeier
(Continued)

FOREIGN PATENT DOCUMENTS

CN 114728699 A 7/2022

OTHER PUBLICATIONS

Abstract for CN114728699 (A), Published: Jul. 8, 2022, 1 page.
European Search Report for Application No. 23208630.6, mailed Jun. 7, 2024, 8 pages.

*Primary Examiner* — Rexford N Barnie
*Assistant Examiner* — Swarna N Chowdhuri
(74) *Attorney, Agent, or Firm* — CANTOR COLBURN LLP

(57) ABSTRACT

A power converter for use with a fan engine of an aircraft comprises an electric-motor interface for electrical connection to an electric motor configured to be mechanically coupled to a driveshaft of the fan engine. The converter includes an inverting electric-motor power stage, having a DC side and an AC side, wherein the AC side of the electric-motor power stage is electrically coupled to the electric-motor interface. It comprises a thrust-reverser interface for electrical connection to an electric actuator of the fan engine for actuating a thrust reverser surface of the fan engine, and an inverting thrust-reverser power stage, having a DC side and an AC side, wherein the AC side of the thrust-reverser power stage is electrically coupled to the thrust-reverser interface.

11 Claims, 3 Drawing Sheets

(56) References Cited

U.S. PATENT DOCUMENTS

| | | | | |
|---|---|---|---|---|
| 11,619,192 | B2 | 4/2023 | Kirkbride et al. | |
| 2005/0135126 | A1* | 6/2005 | Gazel | H02M 7/08 363/67 |
| 2007/0257558 | A1 | 11/2007 | Berenger | |
| 2012/0031995 | A1 | 2/2012 | Maalioune et al. | |
| 2018/0195464 | A1* | 7/2018 | Abel | H02P 3/22 |
| 2019/0186416 | A1* | 6/2019 | Seka | G01R 31/34 |
| 2022/0411082 | A1* | 12/2022 | Delbosc | B64D 27/33 |
| 2023/0159177 | A1 | 5/2023 | Trainer et al. | |

* cited by examiner

AIRCRAFT POWER SYSTEM

CROSS-REFERENCE TO RELATED APPLICATIONS

This application claims the benefit of European Patent Application No. 23208630.6 filed Nov. 8, 2023, the disclosure of which is incorporated herein by reference in its entirety.

FIELD

The present disclosure relates to an electrical power system for a fan engine of an aircraft.

BACKGROUND

During landing, turbofan engines on an aircraft can provide reverse thrust to aid rapid braking of the aircraft. This is accomplished by opening internal or external doors within the engine so as to direct at least a portion of the bypass or exhaust gases forwards instead or rearwards. Such reverse thrust doors are opened and closed using mechanical or electric actuators, such as alternating-current (AC) electric motors.

AC electric motors may also be mechanically coupled to a spool of a turbofan engine and used to start the gas turbine and to generate electrical power. Some designs use the same motor, in a motoring mode, to drive the engine (e.g. for starting the gas turbine), and, at other times, in a generation mode, to generate electricity for powering aircraft systems. In hybrid-electric turbofan engine designs, the same electric motor may also be used, in the motoring mode, to provide thrust for propelling the aircraft forward.

Some aircraft have on-board systems that are powered by a direct-current (DC) bus system. However, converting electrical power between the DC current of such a DC bus, and the alternating current required by and/or generated by an AC electric motor in a turbofan engine, requires complex and heavy power converters. There is a desire to provide lighter AC/DC power conversion for turbofan engines.

SUMMARY

The disclosure provides a power converter for use with a fan engine for an aircraft. The power converter includes: an electric-motor interface for electrical connection to an electric motor configured to be mechanically coupled to a driveshaft of the fan engine; an inverting electric-motor power stage, having a DC side and an AC side, wherein the AC side of the electric-motor power stage is electrically coupled to the electric-motor interface; a thrust-reverser interface for electrical connection to an electric actuator of the fan engine for actuating a thrust reverser surface of the fan engine; an inverting thrust-reverser power stage, having a DC side and an AC side, wherein the AC side of the thrust-reverser power stage is electrically coupled to the thrust-reverser interface; a DC electrical connector comprising a positive voltage terminal and a negative voltage terminal for electrical connection to a DC bus of the aircraft; and circuitry that electrically couples the positive and negative voltage terminals of the DC electrical connector to the DC side of the electric-motor power stage and to the DC side of the thrust-reverser power stage.

The power converter may exist independently of the aircraft. However, the disclosure also provides an aircraft comprising: a fan engine; a power converter for the fan engine; and a DC bus. The fan engine can include: a driveshaft; an electric motor and a mechanism for mechanically coupling the electric motor to the driveshaft; and a thrust reverser system comprising at least one thrust reverser surface and an electric actuator for actuating the thrust reverser surface. The power converter can be any be any converter disclosed herein. In one embodiment, the power converter includes: an electric-motor interface electrically coupled to the electric motor; an inverting electric-motor power stage, having a DC side and an AC side, wherein the AC side of the electric-motor power stage is electrically coupled to the electric-motor interface; a thrust-reverser interface electrically coupled to the electric actuator of the thrust reverser system; an inverting thrust-reverser power stage, having a DC side and an AC side, wherein the AC side of the thrust-reverser power stage is electrically coupled to the thrust-reverser interface; a DC electrical connector comprising a positive voltage terminal and a negative voltage terminal, wherein the DC electrical connector is electrically connected to the DC bus of the aircraft; and circuitry that electrically couples the positive and negative voltage terminals of the DC electrical connector to the DC side of the electric-motor power stage and to the DC side of the thrust-reverser power stage.

The power converter may comprise a housing, such as a box, containing the electric-motor power stage, the thrust-reverser power stage, and the circuitry that electrically couples the DC electrical connector to the DC sides of the power stages. The power converter may be adapted for use within an aircraft, e.g. for mounting within an aircraft.

The DC electrical connector may comprise an electrical socket or a set of terminals (e.g. bolt terminals). The electric-motor and thrust-reverser interfaces may be hard-wired or may comprise connectors, e.g. a socket or a set of terminals. Each electrical socket or set of terminals may be on or adjacent a face of the housing.

The electric-motor power stage may be purely inverting or may be a bidirectional power stage—i.e. comprising inverting circuitry and rectifying circuitry. This can allow the electric-motor power stage to be used for DC to AC conversion when the electric motor is operating in a motoring mode, and also for AC to DC conversion when the electric motor is operating in an electricity-generating mode (e.g. when braking or being driven by a gas turbine of a turbofan engine).

The electric motor may be permanently coupled to the driveshaft, or the electric motor may be configured for selective coupling to the driveshaft (e.g. by a mechanism that comprises a shaft disconnect feature).

The fan engine may be a ducted fan engine. It may comprise a fan located within a nacelle of the engine. It may be an all-electric fan engine, or a series hybrid-electric turbofan engine, or a parallel hybrid-electric turbofan engine, or a conventional turbofan engine. In a first set of examples, the electric motor may be part of a starter-generator system for a turbofan engine (i.e. for starting the gas turbine of a conventional turbofan engine, and for generating electricity for aircraft systems). In a second set of examples, the turbofan engine may be a hybrid-electric turbofan engine. It may be a parallel hybrid-electric turbofan engine. The electric motor may be configured for use in a motoring mode and in a generating mode. It may be arranged, when operating in a motoring mode, to generate thrust for propelling the aircraft forward. It may also, in some examples, be used to start the gas turbine of the turbofan.

The circuitry may electrically connect the DC side of the electric-motor power stage in parallel with the DC side of the thrust-reverser power stage. The power converter may comprise a DC-link stage, electrically connected between the DC connector and the power stages. It may comprise a smoothing capacitor electrically coupled across the positive and negative voltage terminals of the DC connector. The DC-link stage may be electrically coupled to a DC side of the electric-motor power stage and, in parallel, to a DC side of the thrust-reverser power stage. The DC-link stage may electrically couple the positive voltage terminal of the DC connector to a respective positive line of each DC side, and the negative voltage terminal of the DC connector to a respective negative line of each DC side. The DC-link stage may further comprise a smoothing inductor, connected in series with the positive or negative voltage terminal. The power converter may comprise an EMI filter, electrically connected between DC connector and the DC-link stage.

The power converter may be configured for connection to a high-voltage DC bus (HVDC) of the aircraft, e.g. to DC voltage of over 500V, such as 1000V.

Each power stage may be a solid-state power stage. The electric-motor power stage may be configured to perform voltage step up or voltage step down. It may be configured to provide a selectable voltage change, e.g. in dependence on a control input to the power stage.

The thrust reverser surface may be a surface of an internal or external thrust reverser door—e.g. a door in a nacelle of the fan engine. It may have an open state and a closed state and may be arranged to direct gas (e.g. bypass air or exhaust gases) forwards from the engine when in the open state, and not when in the closed state.

The power converter may comprise control circuitry for controlling the thrust-reverser power stage. It may comprise digital thrust-reverser control logic, which may be provided by hardware and/or software. The power converter may comprise control circuitry for controlling the electric-motor power stage. It may comprise a shared FPGA (field programmable gate array), or a shared DSP (digital signal processor), or a shared processor (e.g. scalar or superscalar), configured or programmed for controlling the thrust-reverser power stage and the electric-motor power stage (and optionally one or more further power stages within the power converter).

The power converter may comprise an analog sensing module and/or analog sensing interface, for use with both power stages. It may comprise a housekeeping power supply configured for use with both power stages. It may comprise an FADEC (full-authority digital engine control) interface configured for use with both power stages. It may comprise thermal management apparatus for use by both power stages, e.g. a shared cooling interface or surface, thermally coupled to each of the power stages.

The electric motor may be coupled to the driveshaft (e.g. to a shaft of a gas-turbine spool) by any suitable mechanism, e.g. comprising one or more shafts and/or one or more linkages and/or one or more gears.

The driveshaft may be a spool of a gas turbine of a turbofan engine. The spool may comprise a compressor, a shaft and a turbine. The spool may be a low pressure (LP) spool or a high pressure (HP) spool. The turbofan engine may comprise a plurality of spools. It may comprise one or more further spools that each have a respective electric motor configured to be mechanically coupled to the further spool. The power converter may comprise, for each or one or more further spools, a further electric-motor interface for electrical connection to the respective electric motor, and a further (e.g. bidirectional) electric-motor power stage, having a DC side and an AC side, wherein the AC side of the further electric-motor power stage is electrically coupled to the further electric-motor interface, and wherein the circuitry electrically couples the positive and negative voltage terminals of the DC connector to the DC side of the further electric-motor power stage.

The thrust reverser system may comprise one or more further electric actuators for actuating respective thrust reverser surfaces of the thrust reverse system. The power converter may comprise, for each or one or more further electric thrust-reverser actuators of the fan engine, a further thrust-reverser interface for electrical connection to the respective electric actuator of the fan engine, and a further inverting thrust-reverser power stage, having a DC side and an AC side, wherein the AC side of the further thrust-reverser power stage is electrically coupled to the further thrust-reverser interface, and wherein the circuitry electrically couples the positive and negative voltage terminals of the DC electrical connector to the DC side of the further thrust-reverser power stage.

Features of any example described herein may, wherever appropriate, be applied to any other example described herein. Where reference is made to different examples or sets of examples, it should be understood that these are not necessarily distinct but may overlap.

BRIEF DESCRIPTION OF THE DRAWINGS

Certain examples of the disclosure will now be described, by way of example only, with reference to the accompanying drawings in which.

DETAILED DESCRIPTION

Figure 1:
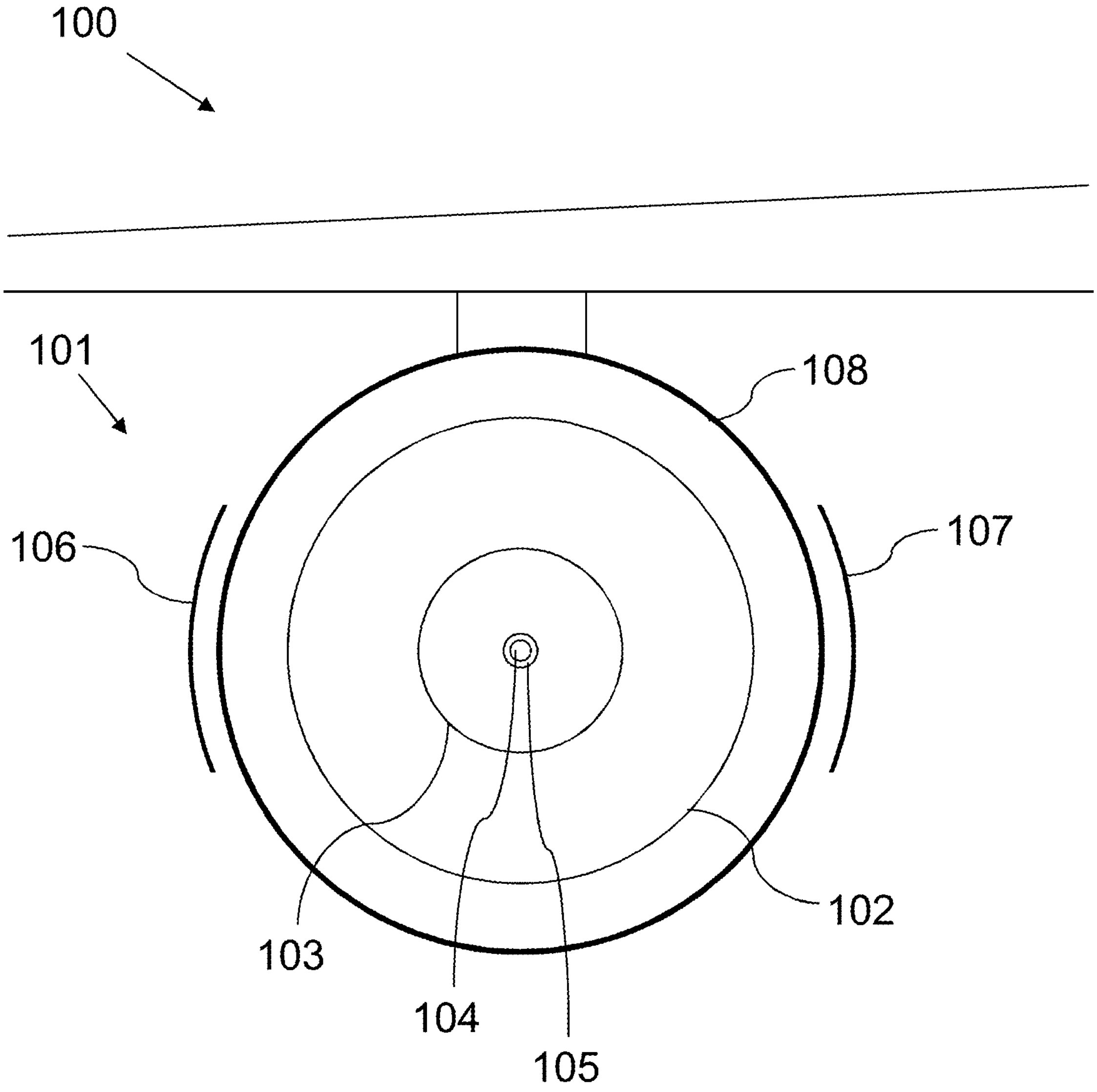
FIG. 1 is a schematic diagram of part of an aircraft showing a cross-section through a turbofan engine of the aircraft.

FIG. 1 schematically shows an aircraft 100 that has a turbofan engine 101 attached to a wing of the aircraft 100.

The engine 101 may be a parallel hybrid-electric turbofan engine—i.e. with forward thrust able to be provided by a gas turbine and by an electric motor that is mechanically coupled to a spool of the gas turbine. This example is a two-spool engine, having both a low pressure (LP) spool 102 and a high pressure (HP) spool 103. The LP spool 102 has an LP shaft 104 that is concentric with an HP shaft 105 of the HP spool 103. Although this example has two spools 102, 103, other engines falling within the present disclosure may have a single spool, or three or more spools.

The LP spool 102 of the hybrid-electric turbofan engine 101 is mechanically coupled to an LP electric motor **102*a*, and the HP spool 103 is mechanically coupled to an HP electric motor 103*a*. One or both of these AC motors 102*a*, 103*a* can be used both for starting the engine 101**, and also for thrust, by providing electrical power to the motors.

The turbofan engine 101 also supplies electrical power to an electrical network of the aircraft 100. This may be a high-voltage DC network, comprising a DC bus 110, which may power various systems and appliances within the aircraft 100. The DC bus 110 may also be electrically coupled to one or more batteries within the aircraft 100.

The engine 101 is equipped with a thrust reverser system to aid aircraft 100 braking during landing. This comprises two electrically-actuated doors 106, 107 that can be opened, e.g. outwardly from a nacelle 108 of the engine 101, to direct bypass air forwards from the engine 101. The left door 106 is operated by an AC left-thrust-reverser electric actuator 106*a*. The right door 107 is operated by an AC right-thrust-reverser electric actuator 107*a*.

Figure 2:
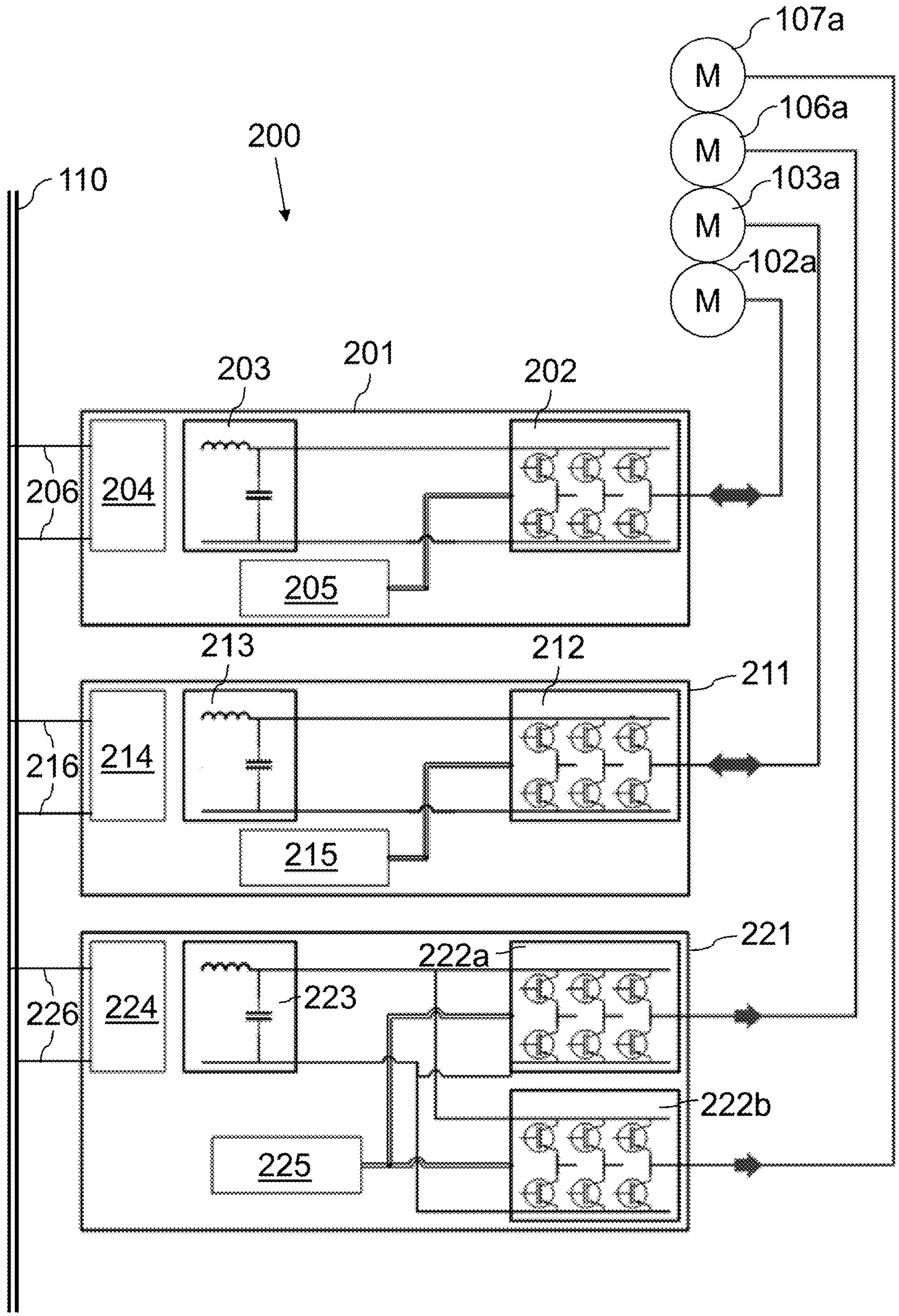
FIG. 2 is a schematic diagram of a power conversion system for a turbofan engine according to a first arrangement.

FIG. 2 exemplifies a first electrical system 200 for providing AC/DC power conversion between a DC bus 110 of the aircraft 100 and the hybrid-electric turbofan engine 101. This is provided by way of contrast with FIG. 3, which shows an electrical power conversion system 300 according to examples of the present disclosure.

The electrical system 200 of FIG. 2 interfaces between the DC bus 110 and the AC spool motors 102*a*, 103*a* and AC thrust-reverser actuators 106*a*, 107*a*. It has an HP-spool power converter, an LP-spool power converter, and a thrust reverser control unit, arranged in three separate housings 201, 202, 203.

The HP-spool converter housing 201 contains a bidirectional AC/DC power stage 202 for rectifying and inverting between AC and DC voltages, depending whether the HP spool motor 102*a* is operating in a motoring mode (e.g. for starting the engine 101 or for providing thrust) or a generation mode (e.g. when being driven by the gas turbine of the engine). A DC side of the power stage 202 is coupled to a DC link 203, on the other side of which is an electromagnetic interference (EMI) filter 204. Also contained within the housing of the HP-spool converter 201 are control, sensing and gate drive circuitry 205 for controlling the power stage 202. The HP-spool converter is electrically connected to the DC bus 110 by a pair of high-voltage positive and negative DC lines 206, electrically coupled to the EMI filter 204.

The LP-spool converter housing 211 contains a bidirectional AC/DC power stage 212 for rectifying and inverting between AC and DC voltages, depending whether the LP spool motor 103*a* is operating in a motoring mode or a generation mode. A DC side of the power stage 212 is coupled to a DC link 213, on the other side of which is an EMI filter 214. Also contained within the housing of the LP-spool converter 211 are control, sensing and gate drive circuitry 215 for controlling the power stage 212. The LP-spool converter is electrically connected to the DC bus 110 by a pair of high-voltage positive and negative DC lines 216, electrically coupled to the EMI filter 214.

The LP thrust-reverser control unit housing 221 contains a pair of inverting AC/DC power stages 222*a*, 222*b* for inverting DC voltage to AC voltage, for respectively supplying AC power to left and right thrust-reverser actuators 106*a*, 107*a*. The DC sides of both power stages 222*a*, 222*b* are coupled to a DC link 223, on the other side of which is an EMI filter 224. Also contained within the housing of the control unit 221 are control, sensing and gate drive circuitry 225 for controlling the power stages 222*a*, 222*b*. The thrust-reverser control unit is electrically connected to the DC bus 110 by a pair of high-voltage positive and negative DC lines 226, electrically coupled to the EMI filter 204.

Figure 3:
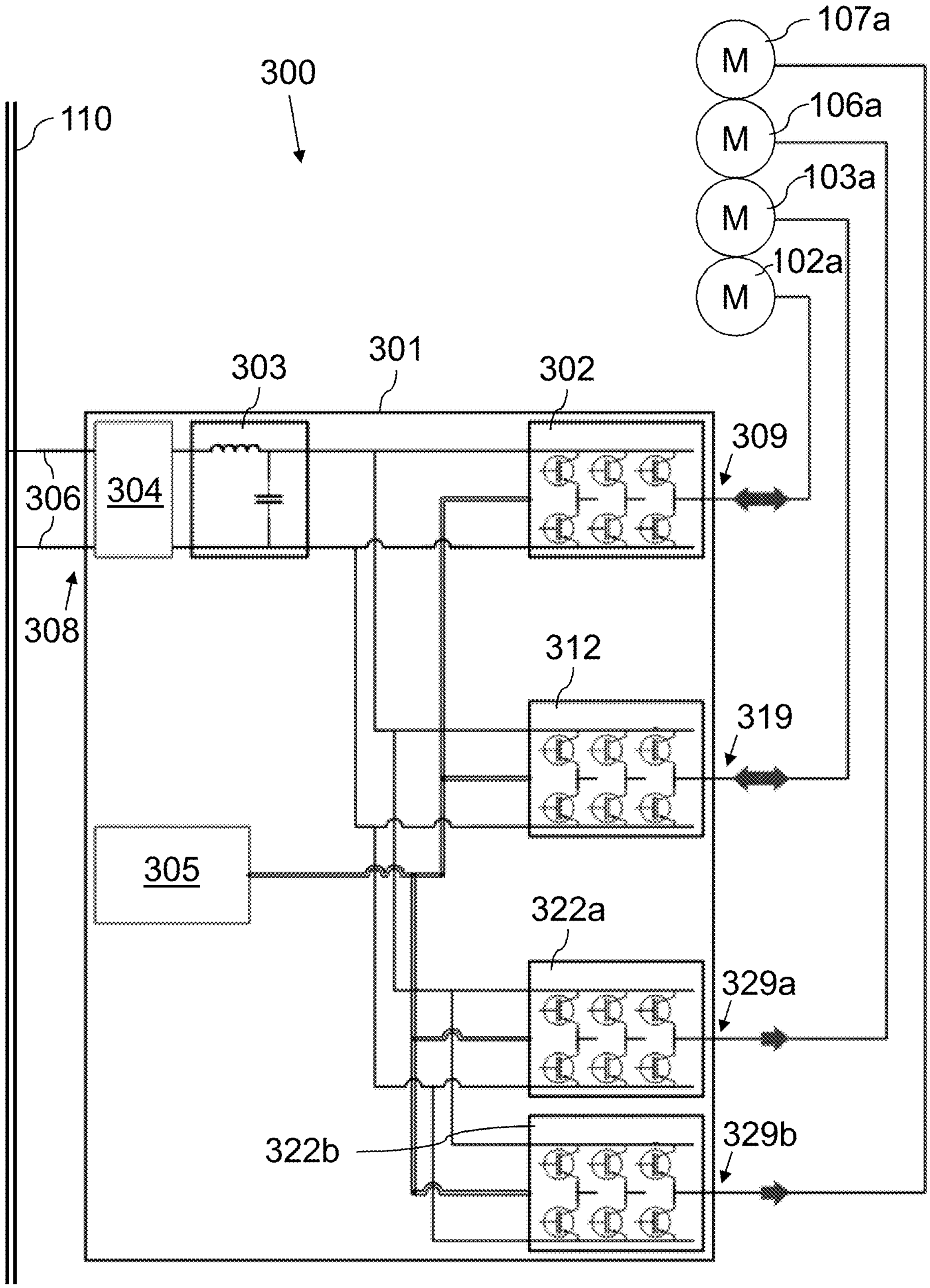
FIG. 3 is a schematic diagram of a power conversion system for a turbofan engine according to the present disclosure.

By contrast, the electrical power conversion system (power converter) 300 of FIG. 3 has an HP-spool power stage 302, an LP-spool power stage 312, and two thrust-reverser power stages 322*a*, 322*b*, all within a common integrated-power-converter housing 301. It also has a single DC link 303 and EMI filter 304, and combined control, sensing and gate drive circuitry 305 for all of the power stages 302, 312, 322*a*, 322*b*.

In some examples, this may lead to reduced weight and/or volume, compared with a system 200 such as the one shown in FIG. 2. It may, in some examples, lead to a reduction of interfaces and/or external cabling. It may, in some examples, support more efficient digital control circuitry. It may, in some examples, simplify thermal management.

The HP-spool power stage 302 provides bidirectional AC/DC rectification and inversion for the HP spool motor 102*a*, to which the AC side of the power stage 302 can be electrically coupled via a high-voltage socket or bolt terminals 309 on a face of the housing 301. Inversion allows the DC power system of the aircraft 100 to provide AC power to the HP spool motor 102*a* when it is operating in a motoring mode—e.g. for starting the engine 101 or for providing thrust. Rectification allows engine power to be converted into electrical power and fed to the aircraft electrical network.

The DC side of the HP-spool power stage 302 is coupled to a DC link 303 that comprises at least one smoothing capacitor arranged in parallel across the positive and negative lines of the DC side of the HP-spool power stage 302 and at least one smoothing inductor connected in series on the positive or negative line. The opposite side of the DC link 303 is connected to an EMI filter 304. The EMI filter 304 is connected to a high-voltage DC socket or bolt terminals 308, on a face of the housing 301, for connection to a pair of high-voltage positive and negative DC cables 306 from a DC bus 110 of the aircraft 100.

The LP-spool power stage 312 provides bidirectional AC/DC rectification and inversion for the LP spool motor 103*a*, independently from the HP-spool power stage 302. The AC side of the LP-spool power stage 312 can be electrically coupled to the LP spool motor 103*a* via a high-voltage socket or bolt terminals 319 on a face of the housing 301. Inversion allows the DC power system of the aircraft 100 to provide AC power to the LP spool motor 102*a* when it is operating in a motoring mode—e.g. for starting the engine 101 or for providing thrust. Rectification allows engine power to be converted into electrical power and fed to the aircraft electrical network. The DC side of the LP-spool power stage 312 is coupled to the DC link 303, in parallel with the HP-spool power stage 302.

A left-thrust-reverser power stage 322*a* provides AC/DC inversion for the left actuator 106*a* independently from the other power stages 302, 312, 322*b*. It can be electrically coupled to the left actuator 106*a* via a high-voltage socket or bolt terminals 329*a* on a face of the housing 301. Inversion allows the DC power system of the aircraft 100 to provide AC power to the left actuator 106*a* and optionally to an associated locking mechanism. The DC side of the left-thrust-reverser power stage 322*a* is coupled to the DC link 303, in parallel with the other power stages 302, 312, 322*b*.

Similarly, a right-thrust-reverser power stage 322*b* provides AC/DC inversion for the right actuator 106*b* independently from the other power stages 302, 312, 322*a*. It can be electrically coupled to the right actuator 106*b* via a high-voltage socket or bolt terminals 329*b* on a face of the housing 301. Inversion allows the DC power system of the aircraft 100 to provide AC power to the right actuator 106*b* and optionally to an associated locking mechanism. The DC side of the right-thrust-reverser power stage 322*b* is coupled to the DC link 303, in parallel with the other power stages 302, 312, 322*a*.

Also contained within the housing 301 are control, sensing and gate drive circuitry 205 for controlling the power stage 202. In some examples, the control circuitry 205 includes an FPGA or a processor (e.g. a DSP or scalar processor) that provides digital control for all of the power stages 302, 312, 322*a*, 322*b*.

In some examples, the thrust reverser system is not normally operational except during a landing phase of the aircraft 100, and, during this phase, the power drawn from the DC link 303 by the HP-spool power stage 302 and LP-spool power stage 312 is not high, such that only a relatively low current need pass through the shared DC link 303 when the thrust reverser power stages 322*a*, 322*b* are active. In some examples, the HP and/or LP spool may operate in a generative mode (e.g. a braking mode) during landing, with the respective power stage 302, 312 operating in a rectifying mode, thereby allowing the thrust reverser system to consume regenerative power and providing a fuel saving.

Although the power stages 302, 312, 322*a*, 322*b* are each represented schematically in FIG. 3 by an arrangement of six transistors, they may each be implemented using any appropriate circuitry. Each may provide inversion or rectification without changing the voltage (e.g. receiving 1,000V DC and outputting 2,000V AC), or may step down the voltage (e.g. receiving 1,000V DC and outputting 500V AC), or may step up the voltage. The DC bus 110 may operate at any voltage, but in some examples it is at 1,000V DC.

The power converter 300 may provide a thermal-management cooling interface that is shared by two, three or all of the power stages 302, 312, 322*a*, 322*b*. It may have a housekeeping power supply within the housing 301 that is similarly shared. It may have a similarly shared FADEC interface. It may have a similarly shared HVDC voltage and/or current sensing interface.

Although the exemplary power conversion system 300 of FIG. 3 system supports independent control of two spools motor 102*a*, 103*a* and two thrust-reverser actuator motors 106*a*, 107*a*, other examples may have more power stages or fewer power stages, all connecting in parallel to a shared DC link within a single housing, depending on the requirements of the particular aircraft engine. In particular, there may be only a single spool power stage, or there may be three or more spool power stages, and there may be only a single thrust-reverser power stage, or three or more thrust-reverser power stages.

In other examples, the engine may be an all-electric fan engine, or a series hybrid-electric turbofan engine, having a reverse thrust system for directing air (e.g. fan air or bypass air or exhaust air) forwards. In such examples, the electrical power conversion system may comprise a power stage for the electric motor that is inverting, but, at least in some examples, not rectifying.

It will be appreciated by those skilled in the art that the disclosure has been illustrated by describing several specific examples thereof, but is not limited to these examples; many variations and modifications are possible within the scope of the accompanying claims.

The invention claimed is:

1. An engine system comprising: a power converter for use with a fan engine for an aircraft, wherein the power converter comprises: an electric-motor interface for electrical connection to an electric motor configured to be mechanically coupled to a driveshaft of the fan engine; an inverting electric-motor power stage, having a DC side and an AC side, wherein the AC side of the electric-motor power stage is electrically coupled to the electric-motor interface; a thrust-reverser interface for electrical connection to an electric actuator of the fan engine for actuating a thrust reverser surface of the fan engine; an inverting thrust-reverser power stage, having a DC side and an AC side, wherein the AC side of the thrust-reverser power stage is electrically coupled to the thrust-reverser interface; a DC electrical connector comprising a positive voltage terminal and a negative voltage terminal for electrical connection to a DC bus of the aircraft; and circuitry that electrically couples the positive voltage terminal and the negative voltage terminal of the DC electrical connector to the DC side of the electric-motor power stage and also to the DC side of the thrust-reverser power stage; and the fan engine, wherein: the fan engine comprises the electric motor and the electric actuator; the electric-motor interface is electrically coupled to the electric motor; the thrust-reverser interface is electrically coupled to the electric actuator; the system further comprising: a housing, wherein the housing contains the electric-motor power stage, the thrust-reverser power stage, and the circuitry that electrically couples the positive and negative voltage terminals of the DC electrical connector to the DC side of the electric-motor power stage and to the DC side of the thrust-reverser power stage; and a DC-link stage within the housing and electrically arranged between the DC connector and the DC sides of the electric-motor and thrust-reverser power stages, wherein the DC-link stage comprises a smoothing capacitor electrically coupled across the positive and negative voltage terminals of the DC electrical connector.

2. The engine system of claim 1, wherein the power converter is configured for connection to a DC bus of the aircraft that operates at a voltage higher than 500V.

3. The engine system of claim 1, wherein the power converter further includes: a shared FPGA, DSP or scalar processor, configured or programmed for controlling the thrust-reverser power stage and for controlling the electric-motor power stage.

4. The engine system of claim 1, wherein the power converter further includes:

one or more further electric-motor interfaces for electrical connection to respective electric motors configured to be mechanically coupled to one or more further driveshafts of the fan engine, and comprising a respective further electric-motor power stage for each further electric-motor interface.

5. The engine system of claim 1, wherein the power converter further includes: one or more further thrust-reverser interfaces for electrical connection to respective electric actuators of the fan engine for actuating one or more further thrust reverser surfaces of the fan engine, and comprising a respective further inverting thrust-reverser power stage for each further thrust-reverser interface.

6. The engine system of claim 1, wherein the thrust reverser surface is a surface of an internal or external thrust-reverser door, the door having an open state and a closed state and arranged to direct gas forwards from the fan engine when in the open state.

7. An aircraft comprising: the engine system of claim 1, wherein the aircraft comprises the DC bus and wherein the DC electrical connector is electrically connected to the DC bus of the aircraft.

8. The engine system of claim 1, wherein each of the DC electrical connector, the electric-motor interface, and the thrust-reverser interface include an electrical socket or set of terminals.

9. The engine system of claim 1, wherein the electric-motor power stage is a bidirectional power stage, configured to perform DC to AC conversion when the electric motor is operating in a motoring mode, and to provide AC to DC conversion when the electric motor is operating in an electricity-generating mode.

10. The engine system of claim 1, wherein the circuitry electrically connects the DC side of the electric-motor power stage in parallel with the DC side of the thrust-reverser power stage.

11. The engine system of claim 1, further comprising an EMI filter, electrically connected between DC electrical connector and the DC-link stage.

* * * * *